United States Patent Office 2,806,856
Patented Sept. 17, 1957

2,806,856

PURIFICATION OF PYRROLIDONE

Charles A. Robinson, Providence, R. I., assignor to Arnold, Hoffman & Co., Inc., Providence, R. I., a corporation of Rhode Island No Drawing. Application April 29, 1954,
Serial No. 426,597

11 Claims. (Cl. 260—326.5)

This invention relates to the purification of pyrrolidone and particularly to the removal of substances from pyrrolidone which act as inhibitors in the polymerization thereof.

Pyrrolidone-2 can be made in various ways; for example, from γ-aminobutyric acid (Gabriel, Ber., 22, 3338), from succinimide (Tafel and Stern, Ber., 33, 2226) or from γ-butyrolactone (Spath and Lintner, Ber., 69B, 2727; Copenhaver and Bigelow, "Acetylene and Carbon Monoxide Chemistry," Reinhold Publishing Corporation, New York, New York, 1949, page 163).

Notwithstanding that distillation is commonly used for the purification of organic liquids, it has been found that even when pyrrolidone is distilled in such a way that the product has a sharp boiling point and other properties commonly used as a measure of purity, its behavior on polymerization varies from sample to sample. In fact, the polymerization inhibitors in certain samples of pyrrolidone are not removed by repeated fractional distillation under vacuum or by distillation from a base such as potassium carbonate or hydroxide.

Even the addition of activators to the polymerization mixture in the manner described in the copending application of Barnes et al., Serial No. 338,552 of February 24, 1953, a procedure which often substantially increases the yield and relative viscosity of polymer, has substantially less effect when these impurities are present in the pyrrolidone.

Accordingly, the principal object of the present invention is the purification of pyrrolidone.

A further object of the invention is to provide novel procedures for removing inhibitors from pyrrolidone which is to be polymerized.

Another object is the provision of a simple yet practical method for accomplishing the purification of pyrrolidone.

Further objects will be apparent from the following detailed description of the invention.

The foregoing objects are accomplished, according to the present invention, by means of a process which involves treating pyrrolidone with a carboxylic acid anhydride and subsequently with a basic compound. The thus treated pyrrolidone can then be easily separated, preferably by distillation, from the impurities associated therewith which are apparently converted into readily separable reaction products by virtue of the treatment with anhydride and base.

The purification, as broadly described above, can be conveniently carried out by first distilling the pyrrolidone from a mixture thereof with a carboxylic acid anhydride, e. g., phthalic anhydride, and thereafter redistilling the thus treated pyrrolidone from a mixture thereof with a non-volatile basic compound such as anhydrous potassium carbonate. Surprisingly, it has been found that such a procedure makes it possible to obtain from pyrrolidone containing polymerization inhibitors a purified pyrrolidone which, when polymerized according to the procedures described in, for example, the above-mentioned copending application Serial No. 338,552, affords high yields of polypyrrolidone possessing desirable relative viscosity characteristics.

The improved results obtained by polymerization of pyrrolidone purified according to the present invention are illustrated in the following table which compares the yield and relative viscosity of polymer obtained by polymerizing pyrrolidone purified (A) by the present process using phthalic anhydride and potassium carbonate; (B) by two fractional distillations under 20 mm. pressure; and (C) by fractional distillation from 2% potassium carbonate under 20 mm. pressure:

| Polymerization activator | Yield | | | Relative viscosity [1] | | |
|---|---|---|---|---|---|---|
| | A | B | C | A | B | C |
| No activator | Percent 37 | Percent 12 | Percent 8 | 5.3 | 2.4 | 2.1 |
| 0.25% acetylpyrrolidone | >70 | 26 | 22 | 6.8 | 2.5 | 2.7 |

[1] Relative viscosity in 1% m-cresol.

As noted above, purification according to the invention may be accomplished by two distinctly different distillations, i. e., a first distillation in the presence of the anhydride and a second distillation from the base. Both distillations are preferably carried out under reduced pressure. Alternatively, the mixture of pyrrolidone and acid anhydride may be heated for a period of time sufficient to insure reaction with the impurities present, after which the basic compound may be added and the mixture distilled to give pyrrolidone of the desired purity. While both methods are suitable, the double distillation is preferred for maximum efficiency. In certain cases, in which the boiling point relationships are favorable, the impurities may be removed in the first distillation and distillation from the carbonate or other base may be omitted.

Any carboxylic acid anhydride can be used to effect purification according to the present invention, for example, there can be mentioned acetic anhydride, propionic anhydride, pthalic anhydride, succinic anhydride, and maleic anhydride.

Any base may be used to treat the pyrrolidone subsequent to its treatment with acid anhydride, although preferably, the base utilized is one which forms non-distillable reaction products with the acidic derivatives of the impurities. As typically suitable bases, there may be mentioned sodium or potassium hydroxide or carbonate.

On carrying out the present process, sufficient acid anhydride should be used to react with at least substantially all of the impurities present in the pyrrolidone. Accordingly, the actual amount of anhydride used can be varied over a wide range, although, generally speaking, satisfactory results are obtained if the anhydride is used in an amount within the range of from about 0.1 to 10% and, preferably, about 1 to 5%, by weight of the pyrrolidone.

The amount of potassium carbonate, or other base, utilized according to the invention, likewise, can be widely varied, dependent primarily upon the amount of impurities present and the quantity of anhydride utilized. However, the base should be used in excess of that necessary to react with the acidic products formed by the anhydride treatment. Hence, amounts of base within the range of from about 1.0 to 10% by weight of the pyrrolidone are suitable with 1 to 5% by weight of the pyrrolidone constituting a preferred range.

The following examples further illustrate, but do not limit, the invention:

Example I

A mixture of 1500 g. of pyrrolidone and 15 g. of propionic anhydride was distilled under 20 mm. pressure using a two-foot column packed with berl saddles. After discarding a forerun of 100 g., a main fraction of 1000 g. was collected. A mixture of 900 g. of this distillate with 18 g. of anhydrous potassium carbonate was again distilled under 20 mm. pressure. A main fraction of 600 g. had a pH of 7.9 (1% in water) and less than 0.02 mole percent of titratable impurity.

Polymerization of a sample of this purified pyrrolidone, following the procedure described in the copending application Serial No. 338,552, afforded polypyrrolidone in yields exceeding 70% of the theoretical amount. In contrast to this, attempted purifications of the same crude pyrrolidone by repeated fractional distillation under 20 mm. pressure and also by distillation from 2% potassium carbonate under 20 mm. pressure both failed to provide pyrrolidone of sufficient purity for polymerization in even moderate yields.

Example II

Crude pyrrolidone was treated as in Example I using 5% of phthalic anhydride in place of the propionic anhydride and subsequently 7% of anhydrous potassium carbonate. The product showed less than 0.02 mole percent of titratable impurity. On polymerization using 0.25% of acetylpyrrolidone as activator, this purified material afforded a yield of polymer in excess of 70% with a relative viscosity (1% in m-cresol) of 6.8.

Example III

Crude pyrrolidone was treated as in Example I using 1% of succinic anhydride and subsequently 2% potassium carbonate. On polymerization using 0.25% of acetic anhydride as activator, this purified product afforded a yield of polymer in excess of 70% with a relative viscosity (1% in m-cresol) of 4.1.

Example IV

Crude pyrrolidone was treated as in Example I using 1% of maleic anhydride and subsequently 2% of potassium carbonate. Polymerization of this purified pyrrolidone, following the procedure described in the copending application Serial No. 338,552 and using 0.5% acetylpyrrolidone as activator, resulted in a yield of polymer exceeding 70% of the theoretical amount.

Example V

A mixture of 400 g. of fractionally distilled pyrrolidone and 20 g. of phthalic anhydride was heated under a nitrogen atmosphere at 140° C. for two hours after which the mixture was distilled under 20 mm. pressure. After discarding a 42 g. forerun, a main fraction of 301 g. was collected, and this product was re-distilled from 2% potassium hydroxide under 20 mm. pressure. The main fraction amounting to 220 g. showed less than 0.02 mole percent of titratable impurity. Compared to a 14% yield of polymer using the untreated, fractionally distilled starting pyrrolidone as monomer, this purified product afforded a 48% yield of polymer having a relative viscosity (1% in m-cresol) of 6.7.

It will be appreciated that various modifications may be made in the invention as described above without in any way deviating from the scope thereof, as defined in the appended claims, wherein:

I claim:

1. A process for removing impurities from pyrrolidone which comprises heating the pyrrolidone to a temperature not above the distillation temperature, first with a carboxylic acid anhydride selected from the group consisting of lower aliphatic hydrocarbon and mono-nuclear aromatic hydrocarbon carboxylic acid anhydrides, and then with a non-volatile strongly basic compound and separating the pyrrolidone by distillation from the products formed by said treatment.

2. The process of claim 1 wherein said basic compound is selected from the group consisting of sodium and potassium hydroxides and carbonates.

3. A process for removing impurities from pyrrolidone which comprises distilling the pyrrolidone from a mixture thereof with a carboxylic acid anhydride selected from the group consisting of lower aliphatic hydrocarbon and mono-nuclear aromatic hydrocarbon carboxylic acid anhydrides, and thereafter distilling said pyrrolidone from a mixture thereof with a non-volatile strongly basic compound.

4. The process of claim 1 wherein said pyrrolidone is treated with sufficient acid anhydride to react with at least substantially all of the pyrrolidone impurities.

5. The process of claim 1 wherein said pyrrolidone is treated with from 0.1 to 10%, by weight thereof, of carboxylic acid anhydride.

6. The process of claim 1 wherein said pyrrolidone is treated with from 1 to 5%, by weight thereof, of carboxylic acid anhydride.

7. The process of claim 1 wherein said pyrrolidone is treated with an amount of basic compound in excess of that necessary to react with the acidic derivatives of the pyrrolidone impurities.

8. The process of claim 1 wherein said pyrrolidone is treated with from 0.1 to 10%, by weight thereof, of basic compound.

9. The process of claim 1 wherein said pyrrolidone is treated with from 1 to 5%, by weight thereof, of basic compound.

10. A process according to claim 1 in which the heating of the pyrrolidone with at least one of said anhydrides and said basic compounds includes distillation.

11. A process according to claim 3 wherein each of the distillations is carried out under subatmospheric pressure.

References Cited in the file of this patent

UNITED STATES PATENTS

| | | |
|---|---|---|
| 2,524,136 | Prill | Oct. 3, 1950 |
| 2,547,494 | Rowland | Apr. 3, 1951 |